United States Patent
Arora et al.

(10) Patent No.: US 10,872,123 B2
(45) Date of Patent: Dec. 22, 2020

(54) PREDICTION OF CONTENT DISTRIBUTION STATISTICS USING A MODEL SIMULATING A CONTENT DISTRIBUTION PROGRAM FOR A SPECIFIED SET OF USERS OVER A TIME PERIOD

(71) Applicant: Facebook, Inc., Menlo Park, CA (US)

(72) Inventors: Ramnik Arora, Palo Alto, CA (US); Kurt Dodge Runke, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 827 days.

(21) Appl. No.: 15/462,896

(22) Filed: Mar. 19, 2017

(65) Prior Publication Data
US 2018/0268303 A1 Sep. 20, 2018

(51) Int. Cl.
*G06F 16/9535* (2019.01)
*G06F 7/58* (2006.01)
(Continued)

(52) U.S. Cl.
CPC ........... *G06F 16/9535* (2019.01); *G06F 7/58* (2013.01); *G06F 16/958* (2019.01); *G06F 30/20* (2020.01); *G06N 7/005* (2013.01); *G06Q 30/02* (2013.01); *G06Q 30/0241* (2013.01); *G06Q 30/0251* (2013.01); *G06Q 30/0269* (2013.01); *G06Q 30/0277* (2013.01); *G06Q 50/01* (2013.01); *G06F 2111/02* (2020.01)

(58) Field of Classification Search
CPC .... G06F 16/9535; G06F 16/958; G06F 30/20; G06F 7/58; G06F 2111/02; G06N 7/005; G06Q 30/02; G06Q 30/0241; G06Q 30/0251; G06Q 30/0269; G06Q 30/0277; G06Q 50/01
USPC ......................................................... 703/13
See application file for complete search history.

(56) References Cited

U.S. PATENT DOCUMENTS

| | | | |
|---|---|---|---|
| 2010/0174593 A1* | 7/2010 | Cao ......................... | A63F 13/12 705/14.12 |
| 2011/0231240 A1* | 9/2011 | Schoen .............. | G06Q 30/0242 705/14.41 |

(Continued)

OTHER PUBLICATIONS

Advertisement Performance Prediction and Selection, An IP.com Prior Art Database Technical Disclosure Authors et. al.: Disclosed Anonymously (Year: 2014).*

(Continued)

*Primary Examiner* — Justin C Mikowski
(74) *Attorney, Agent, or Firm* — Fenwick & West LLP

(57) ABSTRACT

An online system generates, based on previously recorded content presentations, user value distributions for users of the online system. The online system also receives third party specifications from a third party system. Using this information, the online system generates a simulation for presenting content to users of the online system based on the third party specifications. For each iteration of the simulation, the online system randomly selects a user of the online system matching specifications, accesses the user value distribution for the randomly selected user, computes a selection probability of a successful content presentation to the randomly selected user, and simulates a content transmission based on the selection probability. The results of the simulation are reported to the third party system.

19 Claims, 4 Drawing Sheets

(51) Int. Cl.
  *G06N 7/00*   (2006.01)
  *G06F 16/958*   (2019.01)
  *G06Q 30/02*   (2012.01)
  *G06Q 50/00*   (2012.01)
  *G06F 30/20*   (2020.01)
  *G06F 111/02*   (2020.01)

(56) References Cited

U.S. PATENT DOCUMENTS

| | | | | |
|---|---|---|---|---|
| 2012/0203831 A1* | 8/2012 | Schoen | G06Q 10/10 | 709/204 |
| 2013/0046615 A1* | 2/2013 | Liyanage | G06Q 30/0242 | 705/14.45 |
| 2013/0232012 A1* | 9/2013 | Yan | G06Q 10/00 | 705/14.67 |
| 2014/0019261 A1* | 1/2014 | Hegeman | G06Q 30/02 | 705/14.71 |
| 2015/0106178 A1* | 4/2015 | Atazky | H04L 51/32 | 705/14.16 |
| 2015/0356570 A1* | 12/2015 | Goldsmid | G06Q 30/0201 | 705/7.29 |
| 2016/0071162 A1* | 3/2016 | Ogawa | G06Q 30/0269 | 705/14.66 |

OTHER PUBLICATIONS

Yijun Mo et. al., Cloud-Based Mobile Multimedia Recommendation System With User Behavior Information, IEEE Systems Journal, vol. 8, No. 1, Mar. 2014, pp. 184-193. (Year: 2014).*

* cited by examiner

PREDICTION OF CONTENT DISTRIBUTION STATISTICS USING A MODEL SIMULATING A CONTENT DISTRIBUTION PROGRAM FOR A SPECIFIED SET OF USERS OVER A TIME PERIOD

BACKGROUND

This disclosure relates generally to online systems, and in particular to prediction of content distribution statistics using model simulating a content distribution program for a specified set of users over a time period.

Certain online systems, such as social networking systems, allow their users to connect to and to communicate with other online system users. Users may create profiles on such an online system that are tied to their identities and include information about the users, such as interests and demographic information. The users may be individuals or entities such as corporations or charities. Because of the increasing popularity of these types of online systems and the increasing amount of user-specific information maintained by such online systems, an online system provides an ideal forum for third parties to present content to online system users.

In some cases, the online system presents content from third party systems to the online system users. This transmission of content to the client devices of users may be due to a request message received by the online system from the third party system. The third party system provides a set of specifications to the online system that filter those users to whom the online system should transmit the content. However, the ultimate distribution of the content may not match the distribution predicted or desired by the third party system. Thus, there is lack of a good prediction system for content distribution.

SUMMARY

Embodiments of the invention include an online system that is capable of running a simulation of a content distribution program from a third party system.

In one embodiment, the online system generates, based on previously recorded content presentations, user value distributions for users of the online system. These user value distributions indicate user value specified by a third party system for content that is selected for presentation to the user. For example, if a user has been presented with content 100 times in the last 50 days, each associated with a user value, the user value distribution for the last 50 days includes 100 different user values.

The online system also receives third party specifications from a third party system. As described, the third party specifications indicate user specifications, a timeframe, a user value specification, and a total value specification. Using this information, the online system generates a simulation for presenting content to users of the online system based on the third party specifications.

For each iteration of the simulation, the online system randomly selects a user of the online system matching the user specifications. The online system accesses the user value distribution for the randomly selected user. The online system computes a selection probability of a successful content presentation to the randomly selected user. This is based on the user value distribution for the randomly selected user and the user value amount specified in the third party specifications, and indicates a likelihood that a particular user value would result in a successful presentation of content.

The online system simulates a potential content presentation based on the selection probability. If a randomly generated selection variable is less than the selection probability, the simulation is a success. The online system also modifies a total value amount based on an outcome of the simulation, and decrements a remaining time amount. These values are derived from the third party program specifications. If the online system determines that the total value amount or the remaining time amount reaching zero, the online system ends the simulation and generates a report including the statistics for the simulation. Otherwise, the online system repeats another iteration of the simulation.

Using such a method, the online system is able to provide a better understanding of the effects of different content distribution schemes. In comparison to analyzing stale historical data, by actually simulating using the true parameters and specifications of a content distribution program, more accurate results are achieved, and the simulation may be run multiple times to determine whether results are accurate. Additionally, the parameters of the simulation may be varied to optimally tweak the content distribution program, and the simulation can be run very fast compared to an actual content distribution event.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
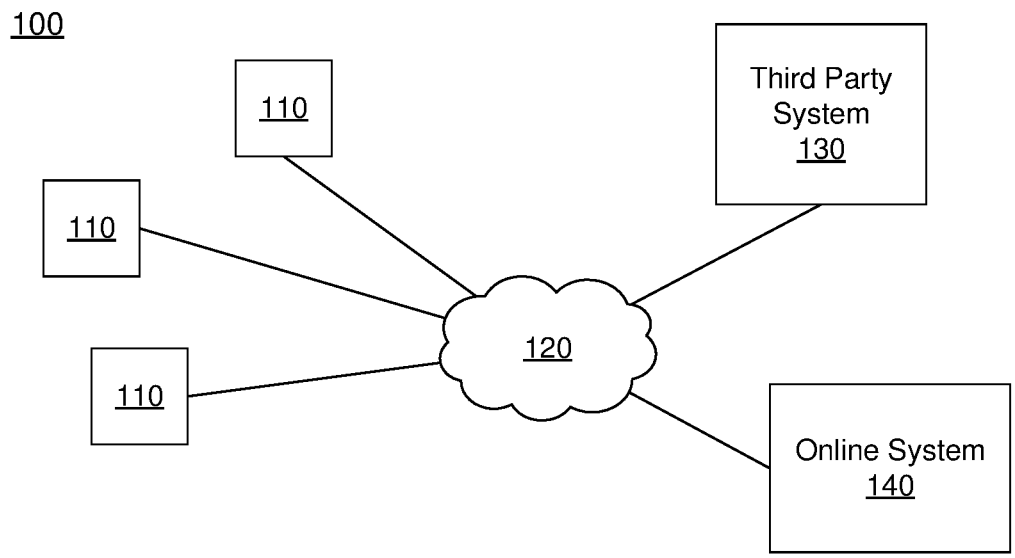
FIG. 1 is a high level block diagram of a system environment for an online system, according to an embodiment.

FIG. 1 is a high level block diagram of a system environment 100 for an online system 140, according to an embodiment. The system environment 100 shown by FIG. 1 comprises one or more client devices 110, a network 120, one or more third-party systems 130, and the online system 140. In alternative configurations, different and/or additional components may be included in the system environment 100. In one embodiment, the online system 140 is a social networking system.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130, such as a sponsored content provider system, may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as content, or information about an application provided by the third party website 130. Specifically, in one embodiment, a third party system 130 transmits the sponsored content to the online system 140 for display to users of the client devices 110. The sponsored content may be created by the entity that owns the third party system 130. Such an entity may be a company producing a product, service, message, or something else that the company wishes to promote. In conjunction with the sponsored content, as described in further detail below, the third party system 130 may also transmit various specifications to the online system 140 indicating constraints and other requirements for the presentation of the content.

Example Online System

Figure 2:
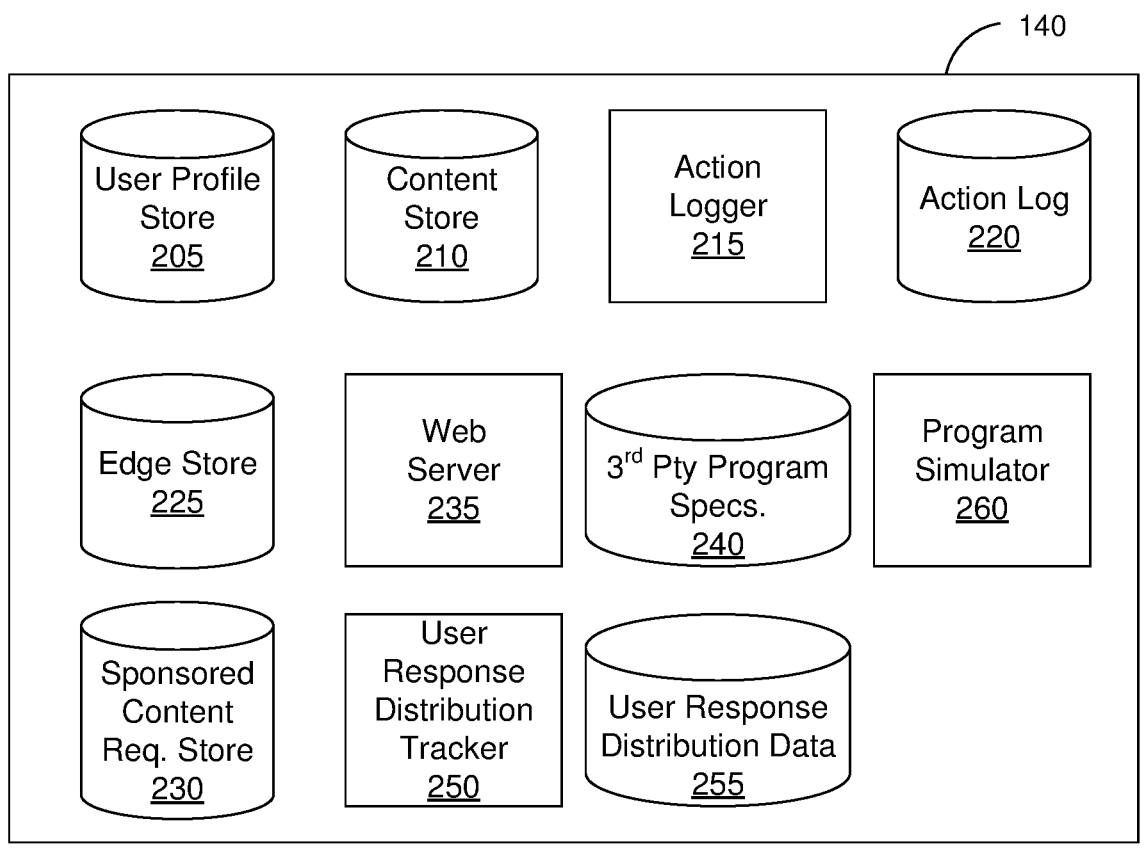
FIG. 2 is an example block diagram of an architecture of the online system, according to an embodiment.

FIG. 2 is an example block diagram of an architecture of the online system 140, according to an embodiment. The online system 140 shown in FIG. 2 includes a user profile store 205, a content store 210, an action logger 215, an action log 220, an edge store 225, a sponsored content request store 230, a web server 235, third party program specifications 240, program simulator 260, user response distribution tracker 250, and user response distribution data 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with sponsored content on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, sponsored content that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The sponsored content request store 230 stores one or more sponsored content requests. Sponsored content is content that an entity (i.e., a sponsored content provider) presents to users of an online system and allows the sponsored content provider to gain public attention for products, services, opinions, causes, or messages and to persuade online system users to take an action regarding the entity's products, services, opinions, or causes. A sponsored content request includes sponsored content and a value amount (e.g., a "bid value"). The sponsored content is text, image, audio, video, or any other suitable data presented to a user. In various embodiments, the sponsored content also includes a landing page specifying a network address to which a user is directed when the sponsored content is accessed. The value amount is associated with an ad request by a sponsored content provider (who may be the entity providing the sponsored content) and is used to determine an expected value, such as monetary compensation, provided by a sponsored content provider to the online system 140 if sponsored content in the sponsored content request is presented to a user, if the sponsored content in the sponsored content request receives a user interaction when presented, or if any suitable condition is satisfied when sponsored content in the sponsored content request is presented to a user. In some embodiments, the expected value to the online system 140 of presenting the sponsored content may be determined by multiplying the value amount by a probability of the sponsored content being accessed by a user. In one embodiment, a sponsored content is an advertisement.

Additionally, a sponsored content request may include one or more targeting criteria specified by the sponsored content provider. Targeting criteria included in a sponsored content request specify one or more characteristics of users eligible to be presented with sponsored content in the sponsored content request. For example, targeting criteria are used to identify users having user profile information, edges, or actions satisfying at least one of the targeting criteria. Hence, targeting criteria allow an sponsored content provider to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows sponsored content providers to further refine users eligible to be presented with sponsored content from an sponsored content request. As another example, targeting criteria identifies users having a connection to another user or object or having a particular type of connection to another user or object.

The web server 235 links the online system 140 via the network 120 to the one or more client devices 110, as well as to the one or more third party systems 130. The web server 235 serves web pages, as well as other web-related content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 235 may provide application programming interface (API) functionality to send data directly to native client device operating systems, such as IOS®, ANDROID™, WEBOS® or RIM®.

Third Party Program Specifications

The third party program specifications 240 are received from third party systems 130 and indicates the specifications for the content distribution program simulation that the online system 140 should execute. The third party program specifications 240 may subsequently be modified or directly used in a program by the online system 140 to transmit content items for presentation to online system users.

The third party program specifications 240 may include a set of user specifications. The user specifications identify various characteristics of users. In one embodiment, the user specifications include the targeting criteria as described above. As noted above, these targeting criteria may describe various user demographics, actions performed, and other characteristic of users that may be used to identify a group or target audience of online system users that have matching user characteristics. For example, a user specification indicating males 18-24 in the USA who have posted comments on an online system page for a sports drink brand would match those users who have indicated themselves to be male, between the ages of 18-24, who are identified (e.g., using geolocation) as being in the USA, and who have been logged as posting a comment on the page about the sports drink brand (e.g., by the action logger 215).

The third party program specifications 240 may include a set of timeframe specifications. For example, this may be a content campaign timespan or length of time that a third party (such as an advertiser) wishes to run a content campaign (e.g., an ad campaign). The timeframe specifications indicate a schedule, which includes one more sets of start and stop timestamps. These timestamps may include date and/or time. The date may be a specific day (e.g., Jan. 1, 2017), or a day of the week, or a day in a month, etc., or simply a number of days (e.g., 30 days). The timeframe specifications indicate a potential schedule for a program of content distribution to online system users. During the time specified in the timeframe specifications, the online system would present the specified content to the online system users.

The third party program specifications 240 may include a user value specification. This indicates a value score that the third party system 130 attributes to each user that matches the user specifications. The value score may correlate with an amount of resources that the third party system 130 is willing to provide to the online system 140, or to some other entity, for the opportunity to distribute a content item(s) to the user. In one embodiment, the value score corresponds to the value amount described above (for the sponsored content request store 230), and may be a bid amount that the third party system 130 is willing to pay for distributing the content item (e.g., a sponsored content item) to a user. In one embodiment, the third party system 130 may specify a different value score for different users. For example, the user value specifications may further divide the users that match the user specifications into sub-groups based on additional user characteristics, and indicate different user values for each of these sub-groups. In another embodiment, the user value scores may be specified based on an action that a third party system 130 wishes to occur. As described above, an action may include those actions performed by the user at the third party system 130, as well as actions performed by the user against the content item, such as clicking on it, linking it, sharing it, liking it, posting a comment regarding it, interacting with it, and so on. In such a case, the online system 140 may dynamically adjust the user value score for each user based on historical information indicating the likelihood that the user will perform the desired action if presented with the content item. Users that are more likely to perform the desired action may be assigned a higher user value score, and vice versa.

The third party program specifications 240 may also include total value specifications. The total value specifications indicate a total value allocation (i.e., resources) for a program of content distribution. For example, this may be the total budget or amount of money that an advertiser has set to spend for an ad campaign. The program of content distribution may distribute content to a number of online system users. Each transmission of the content item may subtract from the total value allocation by an amount equal to the user value score. Once the total value allocation reaches zero, the program of content distribution associated with the total value specification may end. Thus, in addition to the timeframe constraint for the program as described above, the program is also limited by a total value allocation amount. As the total value and user value may be associated with various resources that are expended by the third party system 130, whether the resources are compensation, computer resources, man-hours, promotional considerations, or so on, the third party system 130 may not wish for the program to run indefinitely.

The third party program specifications 240 may include other specifications as well, such as an indication of the specific content item(s) that should be presented to users as part of a content distribution program. The third party program specifications 240 may include the content items themselves. The other specifications may also indicate various constraints. For example, they may indicate that a content item should not be repeatedly transmitted to an online system user more than once every specified of time (e.g., 6 hours), or that one user should only be presented with a content item a total of Y times.

User Response Distribution Tracker

The user response distribution tracker 250 tracks online system users' responses to being presented with content times. For each user of the online system, or for each user of a randomly sample subset of users of the online system (e.g., 10% of users), and for a specific time period (e.g., a past number of days, such as 84 days), the user response distribution tracker 250 tracks the 1) content presentation opportunities (e.g., impression opportunities) for a user, 2) the content that was presented to the user (and possibly from which third party system), 3) the user value score associated with each content presentation, 4) the candidate content items and associated user value submitted for the content presentation opportunity, a 5) timestamp, 6) whether the user performed an action in response to the content presentation, and 7) any other related data.

A content presentation opportunity represents an opportunity to present content to a user. For example, a user may have logged into the online system 140, such that the online system 140 may present a content item from a third party system 130 to the user. These opportunities may present wherever a user uses the online system, e.g., on a mobile application of the online system, a desktop computer, a wearable device, and so on.

The content item that is ultimately presented to a user in a content presentation opportunity is selected by the online system 140 from a set of candidate content items from different third party systems 130. A candidate content item is a content item that is being distributed to users as part of a content distribution program and is associated with user specifications that match (or identify) the user for whom the content presentation opportunity is available. In general, the online system 140 selects the content item from the third party system 130 which has indicated the highest user value score amongst the third party systems 130 with candidate content items. As noted, the user value score is a value that the third party system 130 determines for a user, and represents an amount of resources the third party system 130 is willing to expend in exchange for presenting the content to the user. An indication of this selected content item, as well as the associated user value score and the current timestamp at the time of content presentation, may be stored for each completed content presentation opportunity. Furthermore, the other user values associated with the other candidate content items are stored by the user response distribution tracker 250 for the user as well. The candidate content items, or an indicator of the candidate content items, are tracked and stored as well by the user response distribution tracker 250. The user response distribution tracker 250 may also track and store whether the user completed an action (and what action was completed) after being presented with content.

In one embodiment, the information described above is collected by another element, such as the action logger 215, instead of by the user response distribution tracker 250. Thus, this information may be stored in the user response distribution data 255 or in the action log 220.

The user response distribution tracker 250 may be requested, e.g., by the program simulator 260, to generate user value distribution information for each user. The user value distribution indicates for each user value a percentile distribution for that user value in relation to the other user value for content that has been presented to the user. For example, a user value of X may be in the $80^{th}$ percentile (out of 100) of user values associated with the user for content that has been presented to the user. In other words, out of all content that has been presented to the user (in a particular time period), with each presented content having a user value specified by the corresponding third party system 130, a user value of X falls within the $80^{th}$ percentile of such user values. A user value in the $80^{th}$ percentile is less common for this user than one at, e.g., the $60^{th}$ percentile.

The user response distribution tracker 250 may generate each user value distribution using historical data about the particular user. The user response distribution tracker 250 has tracked the user values associated with each content presentation opportunity for the user, and knows the distribution of the user values for the user. For example, the user response distribution tracker 250 may know for a user that the mean user value for that user (in the time period) is X, and can also determine the standard deviation, variance, and so on for the user values for that user.

The user value distribution may be represented, in one embodiment, as a normal distribution curve (i.e., Bell curve). The user response distribution tracker 250 may compute the curve for a user for a past time period, e.g., 84 days. The user response distribution tracker 250 may precompute the user value distribution for a randomly sampled set of users of the online system 140.

In one embodiment, for each user value distribution, the user response distribution tracker 250 may compute for each percentile in the distribution the probability that a the online system 140 would select the content item from a third party system 130 if the third party system 130 were to provide the user value indicated at that percentile of the distribution. This probability may be known as a selection probability. For example, if the user value is Y, then the user response distribution tracker 250 may determine for the user that the percentile for user value Y in the distribution for the user is 80%, and that the selection probability at the $80^{th}$ percentile for the user is 50%. The user response distribution tracker 250 determines this selection probability for the different percentiles of a user's user value distribution using historical data, such as the data regarding user values for candidate content items that is collected by the user response distribution tracker 250 as described above. For each content presentation opportunity, the user response distribution tracker 250 has determined the user value associated with the selected content item as well as the candidate content items. Thus, the user response distribution tracker 250 also knows the probability that particular user value will result in the associated content item being selected in the content presentation opportunity by analyzing multiple content presentation opportunities for the user over historical data. In another embodiment, the user response distribution tracker 250 does not store the selection probability, and instead, the selection probability may later be determined using a best fit formula that was determined using the above described historical data.

The user response distribution tracker 250 may also compute a frequency of each user's content presentation opportunities over a fixed time period range from the current date (e.g., 84 days), or another time period range. This frequency indicates how many times in the user been presented with content over the time period, and also indicates how frequently the user has accessed the online system 140. The user response distribution tracker 250 may also store for each user a count of the number of content presentation opportunities made to the user in the fixed time period range.

The user response distribution tracker 250 may store any of the above information in the user response distribution data 255.

User Response Distribution Data

The user response distribution data 255 stores information about online system users' responses to content items that have presented to the online system users.

The user response distribution data 255 stores the user value distributions, as well as some or all of the other information tracked by the user response distribution tracker 250 (described above). The information may be stored in one or more formats. For example, the user value distributions may be stored as a distribution curve or in a table. Alternatively, the user value distribution, if it is a normal distribution or other standard statistical distribution, may be stored using variables describing the distribution instead of by including every point in the distribution. For example, if the user value distribution is a normal distribution, the distribution may be stored by storing the average and standard deviation of the distribution. Alternatively, the distribution may be stored using a best fit equation. A best fit equation may be generated for each user value distribution, and this equation is stored. Alternatively, a best fit equation is generated for all, or a subset, of the user value distributions, and for each distribution, the variables for the best fit equation are stored instead of the values of the distribution itself. These variables change for each distribution, but the equation would stay the same. The curve for the distribution can then be derived from any of these methods of storage format. The user response distribution data 255 may also be indexed or hashed by user identifier.

Program Simulator

The program simulator 260 simulates a content distribution program for content from a third party system based on the third party program specifications 240. Automatically, or when requested by a third party system 130, the program simulator 260 receives or accesses a set of third party program specifications 240 for a specific content distribution program. Using the third party program specifications 240, the program simulator 260 simulates the content distribution program. The program simulator 260 may initialize a total value variable equal to the total value amount specified in the total value specification of the third party program specifications 240. The program simulator 260 may initialize a remaining time amount to the total scheduled time specified in the timeframe specifications of the third party program specifications 240. The program simulator 260 may store these variables in relatively high speed memory as they may be updated frequently.

The program simulator 260 selects a simulation set of users of the online system for use in the program simulation. The users for the simulation set are selected from those users that have data in the user response distribution data 255. The simulation set of users include users having user characteristics that match the user specifications of the third party program specifications 240. In one embodiment, the simulation set of users includes all the users of the online system (that are recorded in the user response distribution data 355) that match the user specifications. In one embodiment, the simulation set of users is randomly selected from the users matching the user specifications by the program simulator 260. The program simulator 260 may randomly select users until a subset size of the total number of users meeting the user specifications, e.g., 1%, is reached.

The program simulator 260 initiates an iteration of the simulation. For each iteration, the program simulator 260 randomly selects a user from the simulation set of users, in accordance with the number of content presentation opportunities made to each user in the simulation set as recorded in the user response distribution data 255 for the time period of data recorded in the user response distribution data 255, such that those users with a higher number of opportunities have a higher chance (probability) of being selected. In other words, the probability of a user being selected is proportional to the number of content presentation opportunities made to the user.

To achieve this, the program simulator 260 may generate a total presentation count for the simulation set of users. This is the total number of content presentation opportunities counted for the users in the simulation set as recorded in the user response distribution data 255. The program simulator 260 may divide the total presentation count into multiple ranges. Each range is associated with one of the users in the simulation set, and starts from the end of the previous range (or at zero for the first range), and ends at the previous range plus the number of content presentation opportunities for the associated user. Thus, for example, if the total presentation count is 10, and includes a user A with 9 content presentation opportunities, and a user B with 1 content presentation opportunity, then user A is associated with the range $1 \le$ user A's range<9, and user B with the range $9 \le$ user B's range<10. The range for the users corresponds to the number of recorded content presentation opportunities for the user. The ranges may be ordered randomly, according to the order in which the program simulator 260 randomly selected the users for the simulation set, or according to some other order, such as an ascending or descending range.

The program simulator 260 scales the total presentation count and the included ranges to a total range from 0 to 1. Thus, if the total presentation count is Z, then Z is scaled to 1, and the ranges that make up the total presentation count are scaled proportionally as well. The program simulator 260 generates a random number, the random user selection value, between 0 and 1, and selects a range in which the random user selection value falls. For example, if the random user selection value is 0.95, the program simulator 260 selects the user having a range that includes the random user selection value. Using the example above, user A having 9 content presentation opportunities would have a scaled range of 0-0.89, and user B would have a scaled range of 0.90-1. Note the significant digits of the range values and the random user selection value may have enough significant digits to avoid overlap between different user ranges, or the ranges of users may be rounded up or down to avoid overlap in range values. Here, user B would be selected for a random user selection value of 0.95.

In another embodiment, the program simulator 260 may take the total presentation count, and randomly assign the integer values in the total presentation count to each user, with each user receiving a count of integer values equal to the number of content presentation opportunities made to the user. The program simulator 260 generates the random user selection value between 0-1, scales this value up to the total presentation count, and selects the user with an assigned integer value equal to (or closest to) the scaled up random user selection value.

Once a user is randomly selected, the program simulator 260 accesses the user value specification in the third party program specifications 240 for the current program being simulated, and determines the user value percentile for the randomly selected user for the user value specified in the user value specification and based on the randomly selected user's user value distribution. The distribution may be retrieved by the program simulator 260 from the user response distribution data 255. For example, if the user value specified in the third party program specifications 240 for the current program under simulation is 5, the program simulator 260 accesses the user value distribution for the randomly selected user and may determine that this falls at the 80$^{th}$ percentile.

The program simulator 260 further determines the selection probability for the user at this percentile. As described above, this selection probability indicates the likelihood that a content item at the selected user value will be selected for presentation. The program simulator 260 may retrieve this selection probability from the user response distribution data 255 for the user, or may use a best fit equation derived from historical analysis of prior content presentation opportunities. In one embodiment, the best fit equation for the selection probability is $(\frac{1}{3})[\text{percentile}]^{3/2}$. Thus, in the current example, the selection probability according to the best fit equation (using the percentile 0.8) is approx. 0.24 or 24%. The program simulator 260 generates another random number, the random selection value, which ranges from 0 to 1. If the random selection value is less than (or equal to) the selection probability, the program simulator 260 determines for this simulation iteration that a content item from the third party system 130 (that is associated with the current program being simulated) is transmitted to the user for presentation. Otherwise, the program simulator 260 determines that the content item is not presented. Thus, in the former case, the program simulator 260 simulates that the third party system 130 has "won" the opportunity to present the content, and in the latter case, the program simulator 260 simulates that the third party system 130 has "lost" said opportunity.

Regardless of the outcome of the simulated content presentation opportunity, the program simulator 260 decrements the remaining time amount by a time interval. The time interval may correspond to an average interval, according to historical data, between content presentation opportunities for the users of the online system, or the users recorded in the user response distribution data 255, that match the user specifications for the program. The time interval may instead correspond to an average interval, according to historical data, between content presentation opportunities for the users in the simulation set. For example, if the users matching the user specifications previously accessed the online system and were presented with content every one second on average, then the average interval is one second. Otherwise, the average interval may be set to a default value, such as $\frac{1}{1000}^{th}$ of a day. Note that when decrementing the remaining time amount, the program simulator 260 is decreasing the variable, and not actually waiting or halting for the time interval period. As the program simulator 260 is running a simulation, the speed at which the simulation is run does not depend on the duration of the time interval, but rather on the complexity of the data, memory and network bandwidth and access speeds, and available processing power.

Additionally, if the content presentation is "won," the program simulator 260 also decrements the total value variable by the user value amount for the simulated content presentation opportunity. In some cases, the user value amount is multiplied by 1000, and the actual user value to be subtracted is the user value divided by 1000. Such a user value may be referred to as a "CPM," or "cost per mile."

Note that in some cases, a randomly selected user selected in the above described process cannot be chosen for simulation due to various constraints. These constraints may be specified in the third party program specifications 240 for the program being simulated, or by the online system 140. For example, the online system 140 may specify that a user cannot be presented with the same content item or content from the same third party system 140 more than once during a specified time period (e.g., 6 hours). Also, as noted above, the third party system 130 may have specified that a user cannot be presented with content more than X times for one content distribution program. If the program simulator 260 determines that a user violates one or more of these constraints, the program simulator 260 assumes that content is not presented to the user (i.e., the presentation opportunity is "lost") and decrements the remaining time as described above. Note that the program simulator 260 relies on the remaining time, i.e., the simulated time, to determine the time elapsed for the purposes of determining if the constraints are matched.

Note that if the users of the simulation set are a subset of the total number of users of the online system 140 that match the user specifications for the program, the program simulator 260 may relax the constraints, as a user may be randomly selected more often than in a non-simulated scenario due to the smaller number of users compared to the real scenario. The constraints may be scaled by a value proportionally inverse to the percentage of users of the online system represented in the simulation set (and matching the user specifications). For example, if the simulation set includes 1% of the total users matching the user specifications, then any constraint may be scaled by 100. Thus, although normally a constraint indicates a user should not be presented with content more than once every 6 hours, in the simulation this may be reduced to 36 minutes (6 hrs/100).

In one embodiment, the third party system 130 has indicated a schedule, specifying that content should not be presented during certain periods of time. The program simulator 260 may thus simulate a time-keeping mechanism (e.g., a clock), and for those periods of time where content should not be presented, the program simulator 260 may decrement the remaining time by the scheduled gap during which content should not be presented. Note that in such cases, the user value distributions may be determined to a finer granularity time-wise, and each user may have a distribution per a specific interval of time during the day, during the week, the month, for each season, and so on. The program simulator 260 may select the proper distribution depending upon the current simulated time period.

The program simulator 260 repeats the simulation for multiple iterations until either 1) the total value variable reaches zero, or the 2) remaining time amount reaches zero. For each iteration, the program simulator 260 records 1) an identifier of the user was randomly selected, 2) the percentile for the user value for the randomly selected user, 3) the selection probability for the user, 4) the random selection value that was generated, 5) whether any constraints were encountered, 5) whether the content presentation opportunity was successful (i.e., "won"), 6) the current iteration count, 7) the user value (as it may vary), the selected time interval (as it may vary), 8) and/or any remaining time amount or remaining total value variable amount left after the simulation ends (as one variable may reach zero before the other). The program simulator 260 may collect other information about the simulation, such as total simulation run-time, etc., that are related to the simulation or to each iteration.

In one embodiment, the program simulator 260 may also perform pacing. In such a case, the program simulator 260 may vary the parameters of the simulation if the program simulator 260 determines that the rate of decrease of the total value variable is too high, and that the total value is estimated to reach zero before the remaining time amount reaches zero, or vice versa. The program simulator 260 may vary the user amount and/or the time interval such that the total value variable and the remaining time amount reach zero at substantially the same time in the simulation.

In one embodiment, instead of simply determining a selection probability, the program simulator 260 determines an action probability. The action probability indicates the likelihood that a user will perform an action desired by the third party system 130 after being presented with a content item from the third party system 130. The program simulator 260 determines the action probability from the user response distribution data 255, which, as noted above, may indicate if a user has performed an action or not. To simulate whether a user performed an action, the program simulator 260 also generates another random number and compares this to the action probability. Like with the selection probability, if the random number is less than (or equal to) the action probability, the action is considered to have occurred (i.e., there is a success). Otherwise, the action is considered not to have occurred (i.e., no success). If the third party program specifications 240 indicate that the third party system is valuing users per-action rather than per-presentation opportunity, then in the above simulation, the total value variable is only decremented when the action is simulated to have occurred by the user value amount associated with the completion of an action. If per-presentation opportunity user valuing is used, as is the case described in the above paragraphs, then the program simulator 260, for each successful presentation of content, will decrement the total value variable by an amount equal to the per-action user value scaled by the action probability. For example, if the per-action user value is 5, and the action probability is 0.1%, then the scaled user value per-presentation opportunity is 0.1%*5=0.005.

After completing the simulation, the program simulator 260 may run the simulation again for X number of runs to ensure that the resulting data is consistent. The program simulator 260 may run the simulation until a majority of the results satisfy some statistical factor. For example, the program simulator 260 may run multiple iterations until the statistical power exceeds a certain threshold or an ANOVA test does not reject the null hypothesis (i.e., that the resulting data populations are equal). The program simulator 260 may vary the simulation set of users by performing a new random sampling for each run of the simulation.

The program simulator 260 may report various data from the simulation, this may include 1) the users who were selected in the simulation set(s), 2) the success rate of "winning" the content presentation opportunities, 3) how many content items were delivered (and versus the size of the simulation set), 4) the time interval (i.e., pacing amount used), 5) the user values selected, 6) the user specifications of the users in the simulation set, 7) the simulated rate of user's performing actions, 8) averages (e.g., of user value, etc.), 9) standard deviation and variance (e.g., of certain user characteristics, user value, etc.), 10) number of simulations/iterations run, 11) remaining time and/or remaining total value, and/or 11) so on.

The third party system 130 may also request certain other statistics or data be reported. In addition, the program simulator 260 may report a prediction of the number of unique users that would be presented with content over time given the third party program specifications 240 and the results of the program simulation (i.e., a "reach curve"). Using the results of the program simulation, the program simulator 260 can determine how many unique users were reached in the simulation over time. The program simulator 260 can extrapolate this data to determine how many users of the online system could be reached with the same third party program specifications 240 over time. Note that the number of unique users presented with content may change over time.

This reported data may be used by the online system 140 and/or by the third party system 130. For the online system, this data may help to diagnose any issues with the prediction algorithms of the online system 140. While the online system may assume that a certain content distribution pattern is occurring for a particular content distribution program, this assumption may be false. The simulation described above may be used to diagnose that issue. For the third party system 130, such a simulation may assist the third party system 130 in adjusting the specifications of their content distribution program so that they are able to reach the desired users and meet the desired time and value constraints.

Additional details regarding the above described simulation method are provided below with reference to FIGS. 3-5.

Exemplary Advantages

Using the system described above, the online system 140 is able to provide a better understanding of the effects of different content distribution schemes. In comparison to analyzing stale historical data, by actually simulating using the true parameters and specifications of a content distribution program, more accurate results can be achieved. Furthermore, compared to historical results, which only have one execution, the simulation may be run multiple times to determine whether results are accurate. Additionally, the parameters of the simulation may be varied to optimally tweak the content distribution program. Such tweaking cannot occur by just analyzing historical data. Such a simulation method solves a technical challenge of being able to predict the effects of such content distribution programs delivered by the online system 140 in the scenarios described here, whereas previously the only means of determining the results of such a distribution program would have been to run it in actuality. This would cause permanent effects as the content is actually distributed, and would have the major technical disadvantage of taking the full time period specified in the program, costing a large amount of computer resources, rather than the very fast simulation time period described here.

Exemplary Diagram Illustrating Data Flow for Program Simulation

Figure 3:
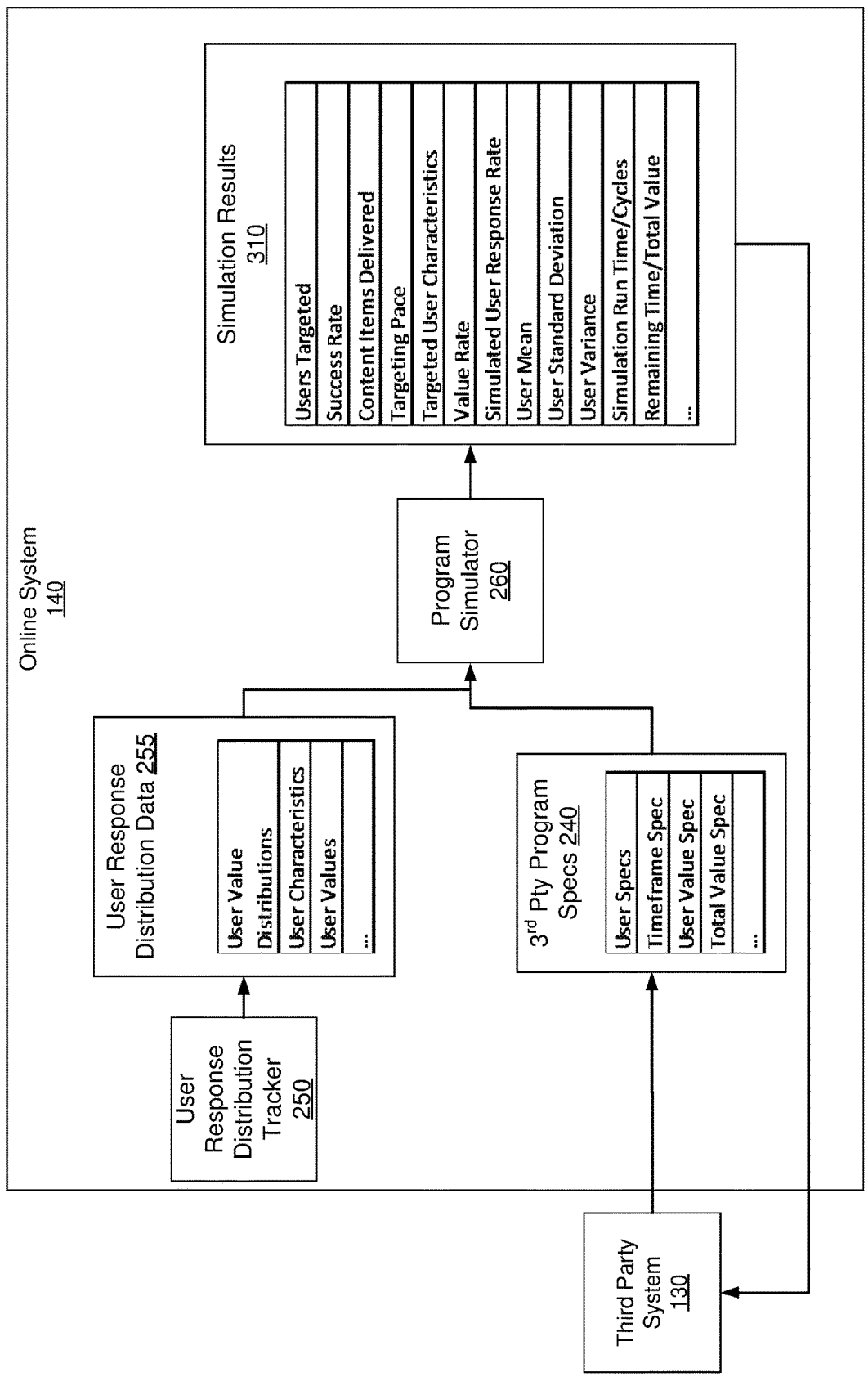
FIG. 3 is a hybrid data flow diagram illustrating the simulation of a content distribution program according to third party program specifications and user response distribution data, according to an embodiment.

FIG. 3 is a hybrid data flow diagram illustrating the simulation of a content distribution program according to third party program specifications and user response distribution data, according to an embodiment. Although a certain data flow and data elements are shown in FIG. 3, in other embodiments a different data flow and/or different elements are used.

Initially, the third party system 130 provides a set of third party program specifications 240. As described above, these specifications indicate various constraints, requirements, and other specifications for a content distribution program to distribute content provided by the third party system 130 to online system users using the online system 140.

Additionally, the user response distribution tracker 250 tracks historical user data, and uses this data to generate user value distributions, record user characteristics, previous user values, and so on, as noted above.

Subsequently, the user response distribution data 255 and the third party program specifications 240 for one content distribution program are accessed or transmitted to the program simulator 260, which runs a simulation of the content distribution program using the user response distribution data 255 and the third party program specifications 240 for that content distribution program. The program simulator 260, after running the simulation, outputs various simulation results 310 regarding the simulation, such as the number of users presented with content, the success rate, and so on, as described above. The online system 140 may provide all or a subset of the simulation results 310 to the third party system 130, and may utilize the results for itself as well.

Exemplary Diagram Illustrating Simulation Process

Figure 4:
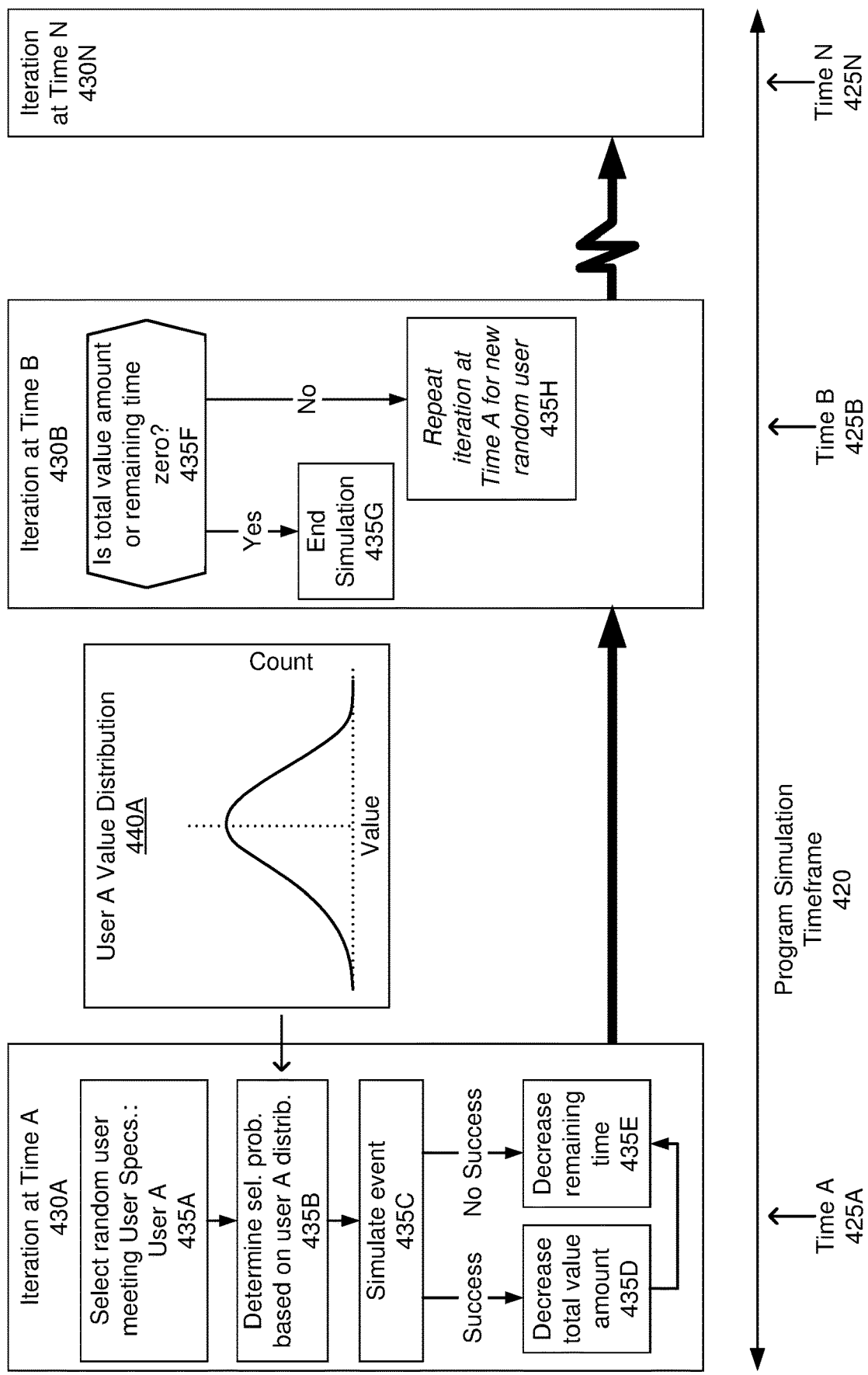
FIG. 4 is a hybrid data flow diagram illustrating the simulation process performed by the program simulator, according to one embodiment.

FIG. 4 is a hybrid data flow diagram illustrating the simulation process performed by the program simulator, according to one embodiment. In one embodiment, the simulation is performed by the program simulator 260.

The illustrated program simulation timeframe 420 runs from time A (425A) to time N (425N). As noted above, this time frame corresponds to the timeframe specification provided by the third party system 130. The program simulator 260 first initializes a total value amount equal to the total value specification as indicated in the third party program specifications 240 and as described above. The program simulator 260 also initializes remaining time value equal to the timeframe specification in the third party program specifications 240 as described above.

At iteration 430A at time A, the program simulator 260 randomly selects 435A an online system user meeting the user specifications of the third party program specifications 240, as described above. This user is user A in the illustration. The random selection of users accounts for the number of times each user has been presented with content from the online system 140. Users that have been presented with content more often (e.g., due to more log-ins) are more likely to be selected. As noted above, the program simulator 260 may determine a random user selection value, and select the user if the random user selection value matches the user's computed range.

The program simulator 260 determines 435B the selection probability for user A based on user A's value distribution 440A. The value distribution 440A shows the number of different user value amounts that have been used when presenting content to the user. Third party systems 130 submit various user value amounts for a content presentation opportunity to the user, and the content from the third party system 130 with the highest user value amount may be selected for presentation to the user. Those highest user value amounts from these different instances of content presentation may be tracked and saved in the user value distribution for that user. For example, user A may have been presented with content items a total of 5 times during a specified time period. Assume that during these 5 times, third party systems 130 submitted user values of 4, 5, 6, 5, and 3 (note in reality the number of samples may be much larger). Thus, the user value distribution for user A would include these 5 user values. For user A, a user value of 7 would fall at a high percentile, as this would be at the high end of user values that have been encountered by the user.

The user values may be modeled, e.g., using a normal distribution. As illustrated in FIG. 4, the distribution has as an x-axis the different user value amounts, and as a y-axis the number, or count, of these different user values. Using the user value distribution for user A, the program simulator 260 determines the percentile of the user value specified in the third party program specifications 240 for user A.

After determining the percentile, the program simulator 260 determines the selection probability for the user at that percentile. The selection probability indicates the likelihood a third party system 130 would be successful in their submission of the content at the particular user value. The selection probability may be determined by a best fit equation, such as the one described above with reference to FIG. 2.

With the computed selection probability, the program simulator 260 simulates 435C the event. This involves generating a random number and determining using the selection probability if the random number indicates a success or no success for the third party system 130 in being able to present the content.

If successful, the program simulator 260 decreases 435D the total value amount. The program simulator 260 also decreases 435E the remaining time by a time interval. If not successful, the program simulator decreases 435E the remaining time only without decreasing the total value amount.

The program simulator 260 continues the simulation at iteration 430B at time B. At the beginning of the iteration 430B, the program simulator 260 may determine 450 if either the total value amount or remaining time is zero. If yes, the program simulator 260 ends 435G the simulation. Otherwise, the program simulator 260 repeats 435 the operations 435A-E for a new random user (e.g., user B).

The program simulator 260 iterates on the simulation until the program simulator 260 determines that the simulation should end (e.g., operation 435G is reached). This may occur later at iteration 430N at time N. Subsequent to the completion of the simulation, the program simulator 260 may report the various statistics and information about the simulation to the online system 130 and/or the third party system 130 as described above.

Exemplary Flow

Figure 5:
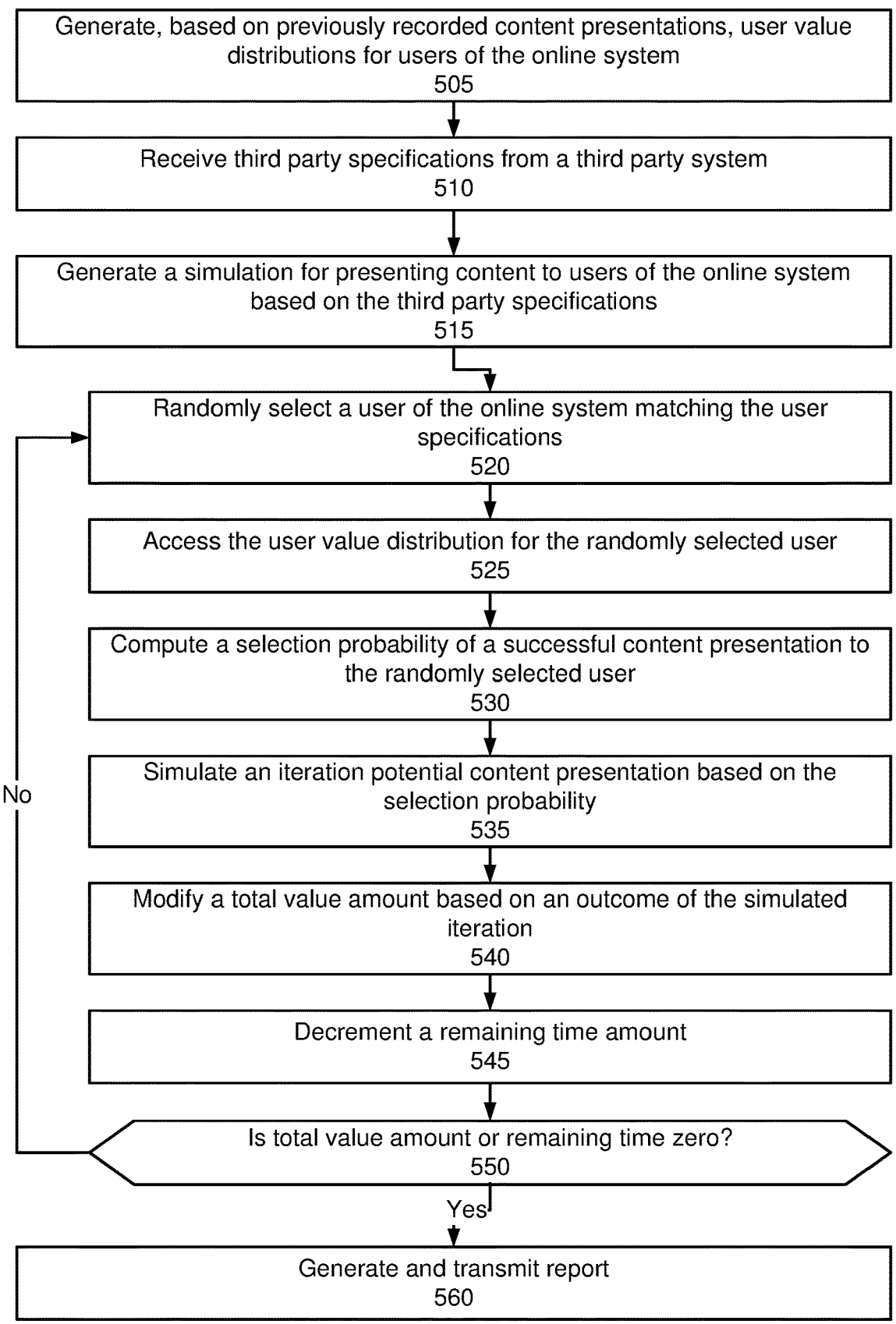
FIG. 5 is a flowchart of one embodiment of a method in an online system for determining simulating a content program, according to an embodiment.

FIG. 5 is a flowchart of one embodiment of a method in an online system for determining simulating a content program, according to an embodiment. In other embodiments, the method may include different and/or additional steps than those described in conjunction with FIG. 5. Additionally, in some embodiments, the method may perform the steps described in conjunction with FIG. 5 in different orders. In one embodiment, the method is performed by one or more of the modules of the online system 140 described above.

The online system 140 generates 505, based on previously recorded content presentations, user value distributions for users of the online system. As described above, these user value distributions indicate user value specified by a third party system for content that is selected for presentation to the user. The online system 140 also receives 510 third party specifications from a third party system. As described, the third party specifications indicate user specifications, a timeframe, a user value specification, and a total value specification. The online system 140 generates 515 a simulation for presenting content to users of the online system based on the third party specifications.

For each iteration of the simulation, the online system 140 randomly selects 520 a user of the online system matching the user specifications. The online system 140 accesses 525 the user value distribution for the randomly selected user. The online system 140 computes 530 a selection probability of a successful content presentation to the randomly selected user. This is based on the user value distribution for the randomly selected user and the user value amount specified in the third party specifications. The online system 140 simulates 535 a potential content presentation based on the selection probability. If a randomly generated selection variable is less than the selection probability, the simulation is a success. The online system 140 modifies 540 a total value amount based on an outcome of the simulation (the total value amount based on the total value specification) and decrements 545 a remaining time amount (the remaining time amount based on the timeframe specification).

If the online system 140 determines 550 that the total value amount or the remaining time amount reaching zero, the online system 140 ends the simulation and generates 560 a report including the statistics for the simulation. Otherwise, the online system 140 repeats another iteration of the simulation.

Other Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
generating, at an online system, based on previously recorded content presentations, bid amount distributions for users of the online system, a bid amount distribution for a user indicating bid amounts specified by third party systems for content that is selected for presentation to the user;
receiving, at the online system, third party specifications for content from a third party system, the third party specifications indicating at least targeting criteria specifications, a total time period for content presentation, a bid amount specification, and a total budget specification; and
generating a simulation for presenting the content to users of the online system based on the third party specifications, each iteration of the simulation comprising:
randomly selecting a user of the online system matching the targeting criteria specifications;
accessing the bid amount distribution for the randomly selected user;
computing a selection probability of a successful content presentation to the randomly selected user based on the bid amount distribution for the randomly selected user and the bid amount specified in the third party specifications;
simulating a potential content presentation based on the selection probability;

modifying a total budget amount based on an outcome of the simulation, the total budget amount based on the total budget specification;

decrementing a remaining time amount, the remaining time amount based on the total time period for content presentation;

responsive to the total budget amount or the remaining time amount being greater than zero, executing another iteration of the simulation;

responsive to the total value budget amount or the remaining time amount reaching zero, ending the simulation;

generating simulation statistics based on the results of the simulation; and transmitting a report to the third party system, the report including the simulation statistics.

2. The method of claim 1, wherein generating the bid amount distributions for a user further comprises;

analyzing previously collected bid amounts specified by third party systems for content items presented to the user, the previously collected bid amounts collected from a specified time period;

grouping the previously collected bid amounts according to the bid amounts; and generating the bid amount distribution of the bid amounts, the bid amount distribution indicating the percentile that a particular bid amount would be at for the user.

3. The method of claim 1, wherein the targeting criteria specifications identify one or more user characteristics of users in the online system, the total time period for content presentation specification indicates a start and stop time for a content distribution program, the bid amount specification indicates an amount of resources provided by the third party system for presenting the content to the online system, and the total budget amount indicates a total amount of resources for the content distribution program.

4. The method of claim 1, wherein the total budget amount is initialized to a total amount of resources specified in the total budget specification, and wherein the remaining time amount is initialized to the difference between a start and stop time of the total time period for content presentation specification.

5. The method of claim 1, wherein users of the online system have a probability of being randomly selected proportional to a number of content presentation opportunities made to the users.

6. The method of claim 1, wherein the selection probability for the randomly selected user is computed by:

analyzing, for the randomly selected user, historical data for the randomly selected user; and determining, based on the historical data, the selection probability, the selection probability being the probability that a content item is selected for presentation based on the position of the bid amount for the content item in the bid amount distribution for the randomly selected user.

7. The method of claim 1, wherein the selection probability is determined according to a best fit equation that accepts a percentile value corresponding to the percentile of the specified bid amount in the bid amount distribution.

8. The method of claim 1, wherein simulating a potential content presentation further comprises:

generating a random selection value, the random selection value being a random number; and in response to the random selection value being less than the selection probability, indicating a successful outcome; and in response to the random selection value being less than the selection probability, indicating a unsuccessful outcome.

9. The method of claim 8, wherein modifying the total budget amount based on an outcome of the simulation comprises decrementing the total budget amount based on the bid amount specified in the bid amount specification in response to the successful outcome.

10. The method of claim 1, wherein simulating a potential content presentation further comprises:

in response to the randomly selected user not meeting a constraint, indicating a unsuccessful outcome, the constraint indicating a minimum simulation time between simulated presentations of content to the same user.

11. The method of claim 1, wherein the remaining time amount is decremented by an average time interval between historical presentations of content for users of the online system matching the targeting criteria specifications.

12. The method of claim 1, wherein the report comprises at least one of the users that were randomly selected in the simulation, a success rate of the simulation, a number of content items that was presented in the simulation, and a number of iterations that the simulation ran for.

13. A computer program product comprising a non-transitory computer readable storage medium having instructions encoded thereon that, when executed by a processor, cause the processor to:

generate, at an online system, based on previously recorded content presentations, bid amount distributions for users of the online system, a bid amount distribution for a user indicating bid amounts specified by third party systems for content that is selected for presentation to the user;

receive, at the online system, third party specifications for content from a third party system, the third party specifications indicating at least targeting criteria specifications, a total time period for content presentation, a bid amount specification, and a total budget specification; and generate a simulation for presenting the content to users of the online system based on the third party specifications, each iteration of the simulation comprising:

randomly selecting a user of the online system matching the targeting criteria specifications;

accessing the bid amount distribution for the randomly selected user;

computing a selection probability of a successful content presentation to the randomly selected user based on the bid amount distribution for the randomly selected user and the bid amount specified in the third party specifications;

simulating a potential content presentation based on the selection probability;

modifying a total budget amount based on an outcome of the simulation, the total budget amount based on the total budget specification;

decrementing a remaining time amount, the remaining time amount based on the total time period for content presentation specification;

responsive to the total budget amount or the remaining time amount being greater than zero, executing another iteration of the simulation;

responsive to the total budget amount or the remaining time amount reaching zero, end the simulation;

generate simulation statistics based on the results of the simulation; and transmit a report to the third party system, the report including the simulation statistics.

14. The computer program product of claim 13, wherein the non-transitory computer readable storage medium has further instructions for the generation of the bid amount distributions for a user, that when executed by the processor, causes the processor to:
analyze previously collected bid amounts specified by third party systems for content items presented to the user, the previously collected bid amounts collected from a specified time period;
group the previously collected bid amounts according to the bid amounts; and
generate the bid amount distribution of the bid amounts, the bid amount distribution indicating the percentile that a particular bid amount would be at for the user.

15. The computer program product of claim 13, wherein users of the online system have a probability of being randomly selected proportional to a number of content presentation opportunities made to the users.

16. The computer program product of claim 13, wherein the non-transitory computer readable storage medium has further instructions for the computation of the selection probability for the randomly selected user, that when executed by the processor, causes the processor to:
analyze, for the randomly selected user, historical data for the randomly selected user; and
determine, based on the historical data, the selection probability, the selection probability being the probability that a content item is selected for presentation based on the position of the bid amount for the content item in the bid amount distribution for the randomly selected user.

17. The computer program product of claim 13, wherein the non-transitory computer readable storage medium has further instructions for the simulation of a potential content presentation, that when executed by the processor, causes the processor to:
generate a random selection value, the random selection value being a random number; and
in response to the random selection value being less than the selection probability, indicate a successful outcome; and
in response to the random selection value being less than the selection probability, indicate a unsuccessful outcome.

18. The computer program product of claim 13, wherein the remaining time amount is decremented by an average time interval between historical presentations of content for users of the online system matching the targeting criteria specifications.

19. The computer program product of claim 13, wherein the report comprises at least one of the users that were randomly selected in the simulation, a success rate of the simulation, a number of content items that was presented in the simulation, and a number of iterations that the simulation ran for.

* * * * *